(12) United States Patent
Edwards (10) Patent No.: US 11,480,676 B2
(45) Date of Patent: Oct. 25, 2022

(54) DISTANCE DETECTOR

(71) Applicant: MGI Golf Pty Ltd, Nunawading (AU)

(72) Inventor: Ian Stuart Edwards, Toorak (AU)

(73) Assignee: MGI Golf Pty Ltd, Nunawading (AU)

( * ) Notice: Subject to any disclaimer, the term of this patent is extended or adjusted under 35 U.S.C. 154(b) by 690 days.

(21) Appl. No.: 16/154,611

(22) Filed: Oct. 8, 2018

(65) Prior Publication Data

US 2019/0041516 A1 Feb. 7, 2019

Related U.S. Application Data

(63) Continuation of application No. PCT/AU2017/050326, filed on Apr. 13, 2017.

(60) Provisional application No. 62/322,317, filed on Apr. 14, 2016.

(51) Int. Cl.
| | |
|---|---|
| *G01C 15/00* | (2006.01) |
| *G01S 17/08* | (2006.01) |
| *G01S 7/51* | (2006.01) |
| *G01C 3/04* | (2006.01) |
| *G01S 17/86* | (2020.01) |
| *A63B 57/30* | (2015.01) |
| *G01S 7/481* | (2006.01) |

(52) U.S. Cl.
CPC .............. *G01S 17/08* (2013.01); *A63B 57/30* (2015.10); *G01C 3/04* (2013.01); *G01C 15/002* (2013.01); *G01S 7/4811* (2013.01); *G01S 7/51* (2013.01); *G01S 17/86* (2020.01); *A63B 2220/10* (2013.01)

(58) Field of Classification Search
CPC .................................................... A63B 69/36
See application file for complete search history.

(56) References Cited

U.S. PATENT DOCUMENTS

| | | | |
|---|---|---|---|
| 6,023,322 A | 2/2000 | Bamberger | |
| 2007/0291994 A1* | 12/2007 | Kelle | ................... G01S 7/4802 382/110 |
| 2008/0198356 A1 | 8/2008 | Hocknell et al. | |

(Continued)

OTHER PUBLICATIONS

International Preliminary Report on Patentability dated Jul. 27, 2018 in International Application No. PCT/AU2017/050326. 4 pages.

(Continued)

*Primary Examiner* — Hovhannes Baghdasaryan
(74) *Attorney, Agent, or Firm* — Kilpatrick Townsend & Stockton LLP (57) ABSTRACT

A distance detector comprising: a laser transmitter and receiver for generating a laser beam to irradiate an object and to receive return light reflected in response from the object, an image detection system for generating an image of a view, the image detection system including an objective lens for collecting light from the view, an image sensor for receiving light collected by the objective lens and for generating the image therefrom, and a digital display for displaying the image such that the digital display displays a real-time image of the view, a laser beam indicium on the digital display or a laser beam indicium generator configured to display laser beam indicium on the digital display, wherein the laser beam indicium indicates a direction of the laser beam, and a range-finding system for determining the distance to an object irradiated by the laser beam using return light and for displaying distance.

24 Claims, 8 Drawing Sheets

(56) References Cited

U.S. PATENT DOCUMENTS

| | | |
|---|---|---|
| 2010/0020223 A1 | 1/2010 | Vice |
| 2011/0022314 A1 | 1/2011 | Balardeta et al. |
| 2012/0105283 A1 | 5/2012 | Nyhart et al. |
| 2015/0332500 A1 | 11/2015 | France |
| 2016/0074724 A1* | 3/2016 | Terre .................. G01S 17/88 |
| | | 356/4.01 |

OTHER PUBLICATIONS

Extended European Search Report dated Oct. 28, 2019 in EP Patent Application No. 17781640.2. 7 pages.

\* cited by examiner

DISTANCE DETECTOR

CROSS-REFERENCES TO RELATED APPLICATIONS

This application is a continuation application of International Patent Application No. PCT/AU2017/050326 entitled "DISTANCE DETECTOR," filed on Apr. 13, 2017, which claims priority to U.S. Provisional Patent Application No. 62/322,317, filed on Apr. 14, 2016, which are herein incorporated by reference in their entirety for all purposes.

FIELD OF THE INVENTION

The present invention relates to a method, device and computer program for determining a distance to an object, and in particular to a distance detector that includes a laser range-finding system.

BACKGROUND

Range-finders are increasingly being used in, for example, golf to measure target distances and in particular the distance to pins (that is, sticks with flags placed in holes to indicate the positions of the holes).

One existing type of rangefinder for use on a golf course employs GPS. Another existing type of rangefinder for use on a golf course is a laser rangefinder.

GPS rangefinders require the golf course to be mapped in order to find the distance to and object in the course.

Laser rangefinders do not rely on GPS coordinates but their accuracy is vulnerable to how well a user operates the device. Generally, a user aims the laser rangefinder towards an object through a view port. Once the object is in view, the user activates a laser beam which is emitted in a forwards direction by the device and hence, it is hoped, towards the object. If so, the laser beam is reflected by the object and a portion returns to the device, which calculates and displays the distance to the object based on, for example, a time-of-flight calculation.

One problem that the user may encounter is establishing a precise lock on the target and ensuring that the laser beam is pointing at the correct object (for example, the flag). Additionally, some golf courses do not provide any aids for laser distance measurement, such as laser reflectors positioned on flag sticks on the greens, which makes it impractical for the device to be used as accurately as theoretically possible.

Some rangefinders come with advanced features, such as ARC (angle range compensation) and multi-distance ability. Some devices have the ability to display the distance to the nearest target among multiple objects, to facilitate measurement of the distance to the flagstick rather than to a background object.

SUMMARY OF THE INVENTION

According to a first broad aspect of the present invention, there is provided a distance detector comprising:
 a laser transmitter and receiver for generating a laser beam to irradiate an object and to receive return light reflected in response from the object,
 an image detection system for generating an image of a view, the image detection system including an objective lens for collecting light from the view, an image sensor for receiving light collected by the objective lens and for generating the image therefrom, and a digital display for displaying the image such that the digital display displays a real-time image of the view,
 a laser beam indicium on the digital display or a laser beam indicium generator configured to display laser beam indicium on the digital display, wherein the laser beam indicium indicates a direction of the laser beam, and
 a range-finding system for determining the distance to an object irradiated by the laser beam using the return light and for displaying the distance, the object being irradiated by the laser beam and the laser beam indicium at least partially overlapping in the digital display.

In an embodiment, the range-finding system displays the distance to an object on the digital display.

In an embodiment, when the laser beam is pointed at a particular object for more than a first predefined time interval the range-finding system displays the distance to the particular object on the digital display for a second predefined time interval. The range-finding system may cease to display the distance to the particular object after the second predefined time interval.

In an embodiment, the range-finding system is configured to:
 i) calculate the distance to a plurality of objects,
 ii) determine the closer or closest of said plurality of objects, and
 iii) display the distance to the closer or closest object.

In an embodiment, the distance detector further comprise a feature detector configured to detect a preselected target object and to control the digital display to display a target object indicium indicating a location of the target object on the digital display. The target object indicium may at least partially boxes the target object as displayed on the digital display. The target object indicium may comprise one or more elements displayed on the digital display suggestive of a square, rectangle or other quadrilateral.

In an embodiment, the range-finding system is configured to determine the distance to the target object when the target object indicium and the laser beam indicium coincide or overlap.

In an embodiment, the range-finding system comprises the laser beam indicium generator.

The laser beam indicium may comprise cross-hairs. The laser beam indicium may comprise one or more physical marks on the digital display.

According to this aspect, there is also provided a distance detection method comprising:
 transmitting a laser beam so as to irradiate an object;
 receiving return light reflected from the object in response to irradiation of the object;
 generating an image of a view from the return light;
 displaying the image on a digital display such that the digital display displays a real-time image of the view;
 displaying a laser beam indicium on the digital display, wherein the laser beam indicium indicates a direction of the laser beam, and
 determining the distance to an object irradiated by the laser beam using the return light, the object being irradiated by the laser beam and the laser beam indicium at least partially overlapping in the digital display; and
 displaying the distance.

The method may comprise determining the distance to a plurality of objects.

According to a second broad aspect, the present invention provides a distance detector comprising:

a laser transmitter and receiver for generating a laser beam to irradiate an object and to receive return light reflected from the object, an objective lens for collecting light of a view that includes the object, a view-finder for a user to view the object, an image sensor for receiving light collected by the objective lens of the view and output an image, a feature detector configured to receive the image and detect therein a preselected target object, and a range-finding system configured to determine the distance to an object using the return light, and to display the distance The view-finder may receive light also (in common with the image sensor) collected by the objective lens, or from another lens or lenses provided in the detector.

In an embodiment, the range-finding system is responsive to the detection of the target object by determining and displaying the distance to the target object.

In another embodiment, the feature detector is configured to respond to detection of the target object by generating an alert to alert the user.

The distance detector may comprise a laser beam indicium or a laser beam indicium generator configured to display laser beam indicium, wherein the laser beam indicium indicates a direction of the laser beam.

The distance detector may be configured to display the laser beam indicium when the feature detector detects the preselected target object, when the range-finding system determines the distance to the target object, or when the preselected target object is centred in the view-finder.

In an embodiment, the laser beam indicium comprises cross-hairs. In another embodiment, the range-finding system displays the laser beam indicium so as to be viewable through the view-finder. The laser beam indicium may comprise one or more physical marks on the view-finder.

In an embodiment, the detector includes a digital display and the range-finding system displays the distance to the target object on the digital display.

When the laser beam is pointed at a particular object for more than a first predefined time interval, the range-finding system may display the distance to the particular object for at least a second predefined time interval. The range-finding system may cease to display the distance to the particular object after the second predefined time interval.

According to this aspect, there is also provided a distance detection method comprising:

transmitting a laser beam so as to irradiate an object;

receiving return light reflected from the object in response to irradiation of the object;

collecting light of a view that includes the object with an objective lens;

outputting an image of the view based on the return light;

receiving the image and detecting therein with a feature detector a preselected target object;

determining the distance to an object (such as an instance of the preselected target object) using the return light; and displaying the distance.

The method may comprise determining the distance to a plurality of objects. In one example, the plurality of objects may include one or more instances of the preselected target object.

The method may include a user viewing the object through a view-finder.

It should be noted that any of the various individual features of each of the above aspects of the invention, and any of the various individual features of the embodiments described herein including in the claims, can be combined as suitable and desired.

Advantages and other features of the invention will become apparent from the following drawing, description and claims.

BRIEF DESCRIPTION OF THE DRAWINGS

In order that the invention may be more clearly ascertained, embodiments will now be described, by way of example, with reference to the accompanying drawing, in which.

DETAILED DESCRIPTION

Figure 1A:
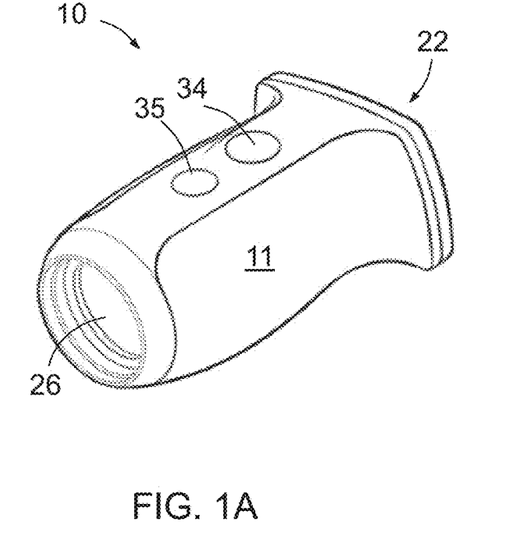
FIGS. 1A and 1B are respectively rear and front perspective views of a distance detector according to a first embodiment of the present invention.
Figure 1B:
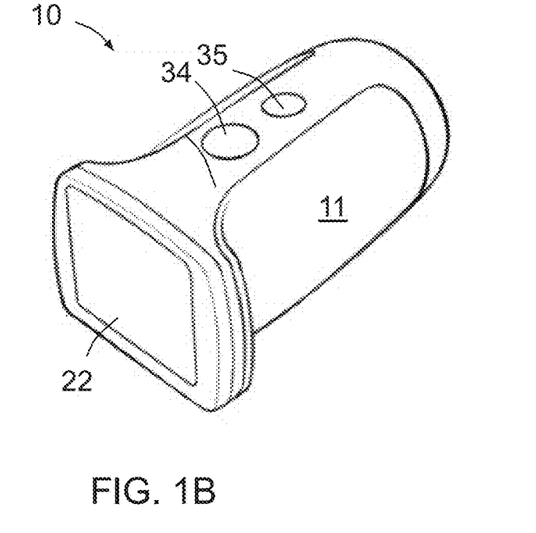

FIGS. 1A and 1B are respectively rear and front perspective views of a distance detector (10) according to a first embodiment of the present invention. Distance detector (10) is in the form of an integral device having a main body (11), a digital display (22) and control button(s) (34) to allow the user to select operational modes and the like. The main body (11) includes a laser system (13) (which includes a laser transmitter (12) and receiver (14)), an image detection system (16) and a range-finding system (24). The back window (26) in FIG. 1 is schematically represented as a single entity which includes the laser input and output.

Figure 2:
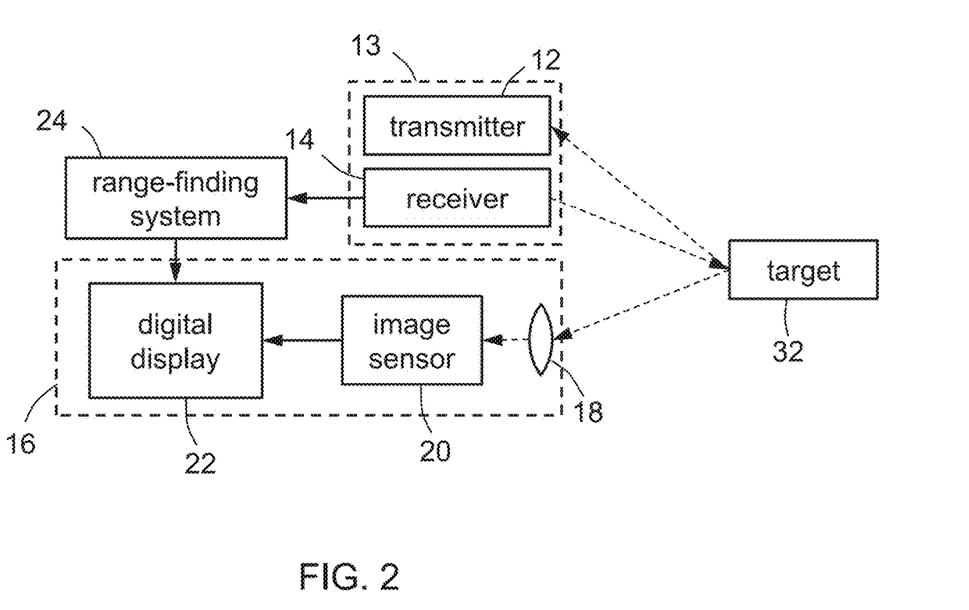
FIG. 2 is a block diagram of the main components of the distance detector of FIGS. 1A and 1B, with a target object.

FIG. 2 is a block diagram of the main functional components of the distance detector (10). The distance detector (10) includes a laser system (13) including a laser transmitter (12) for generating a laser beam. The laser beam is activated by pressing a button (35) on the distance detector and is directed towards one or more objects of interest. The laser beam irradiates an object (32) and it is reflected therefrom. The laser receiver (14) captures the light that is reflected from the object in response to the laser beam directed thereto.

The distance detector (10) further includes an image detection system (16) that generates an image of the view available to the user. The image detection system (16) includes an objective lens (18) for collecting light from the view, an image sensor (20) for receiving light collected by the objective lens (18) and for generating the image therefrom, and a digital display (22) for displaying the image such that the digital display (22) displays a real-time image of the view.

Displaying a real-time image of the view on the digital display (22) helps the user to obtain a view of long distance objects without using a port view or an ocular. Users with visual aids may find it difficult to look into an ocular and accurately focus on an object of intersection. The display (22) facilitates the view of a real-time image and the magnification thereof. The display may incorporate touch-screen functionality to enable a golfer to interact with the device by touching display areas to select operational modes, obtain a magnified image of the view, and choose other type of options that the device might have built-in.

Additionally, to further aid the user to point at the object of interest, the distance detector (10) further includes a laser beam indicium (28) on the digital display (22) indicating the direction of the laser beam. The laser beam indicium (28) can, for example, include cross hairs.

The laser beam indicium (28) can be in the form of one or more physical marks on the display. Alternatively, the distance detector (10) can include a software that displays the laser beam indicium (28) on the digital display (22).

The distance detector (10) further includes a range-finding system (24) for determining the distance to an object (32) irradiated by the laser beam. The range finding system (24) includes a software that is configured to extrapolate the distance travel by the laser beam, when the object (32) is irradiated by the laser beam and the laser beam indicium (28) at least partially overlapping in the digital display. The range-finding system (22) can also be configured to electronically display the laser beam indicium (28) on the digital display (22).

In an embodiment, the range-finding system (24) is further configured to display the distance to an object (32) on the digital display (22). In some embodiment the distance is displayed on a predefined position on the display. In other embodiments the distance is displayed close to, or partially overlapped with the image of the object on the screen (22).

Figure 3A:
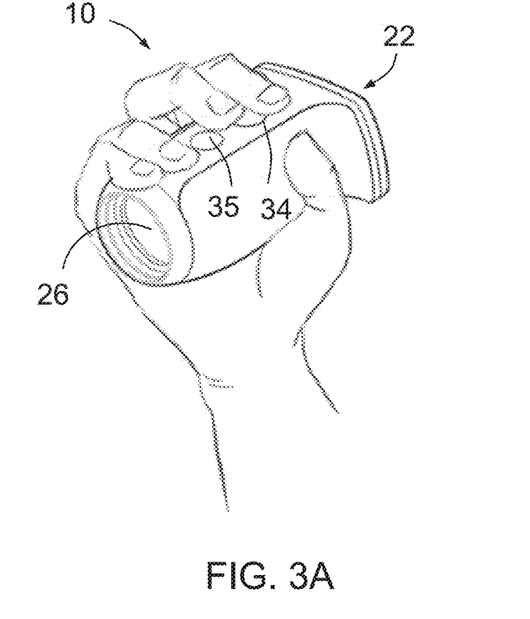
FIGS. 3A and 3B are views of the detector system held by the user.
Figure 3B:
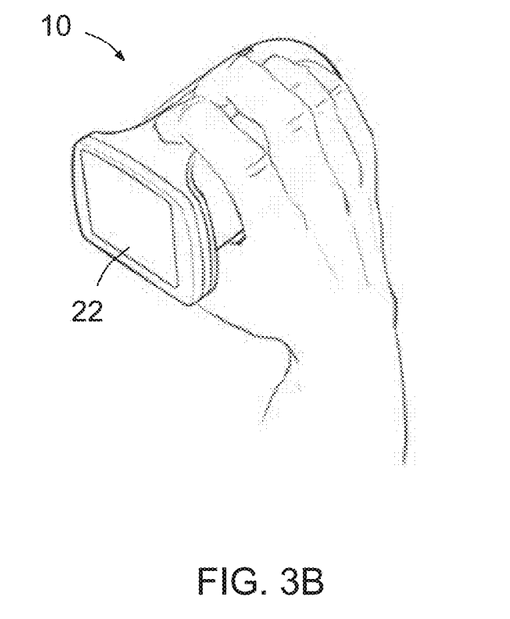

FIGS. 3A and 3B show the range-finding device (10) held by the user. The user can easily handle the device with one hand and select operational modes on the device (10).

In an embodiment, the distance detector includes a "scanning mode" that allows the user to move the laser beam across a range of objects to find the distance thereto in real time.

In some embodiment the distance detector includes a button (34) for selecting the "scanning mode". The mode remains active for the time the button (34) is pressed by the user. The mode is automatically deactivated when the user releases the button (34). In some embodiments the user can manually or electronically choose the window of time that the scanning mode remain active. In an alternative embodiment, the user can activate the "scanning mode" by selecting the option on the screen (22) from a scroll down menu.

In an embodiment, the device (10) includes a "lock-in mode" which allows the user to select a particular object and be assured that the distance obtained relate to the particular object selected. The user can select the "lock-in mode" on the device by pushing a button (34) on the device (10) or by choosing from options on the display (22). Other ways for selecting the operative mode may also be available.

When the "lock in mode" is activated, the user can obtain the distance to a particular object (32) by pointing the laser beam for more than a first predefined time interval. The first predefined time interval can be for example 1 second or more. The particular object (32), that can be for example a flag in a golf course, is locked in the image display (22) and the range-finding system (24) calculates and displays the distance to the particular object (32) on the digital display (22) for a second predefined time interval. The second predefined time interval can be for example 30 seconds or any time interval that allows the user to comfortably read out the distance on the screen (22). According to an optional features of the described embodiment after the distance has been displayed for the second predefined time interval, the displayed distance automatically disappears. Another optional feature consists of the display (22) being automatically switched off after the second predefined time interval.

In some embodiments the distance to a plurality of objects are calculated and displayed on the digital display (22) while the user move the device (10), in another embodiments the range-finding system (24) includes a software configured to calculate distance to a plurality of objects included in the real-time image of the user's view and determine the closer object between the plurality of objects. The range-finding system (24) will then display the distance to the closer object between said plurality of objects. This particular feature allows the user to avoid detecting objects in the background, such as trees or pole, rather than the target object (32) such as the flag in a golf course.

Figure 4:
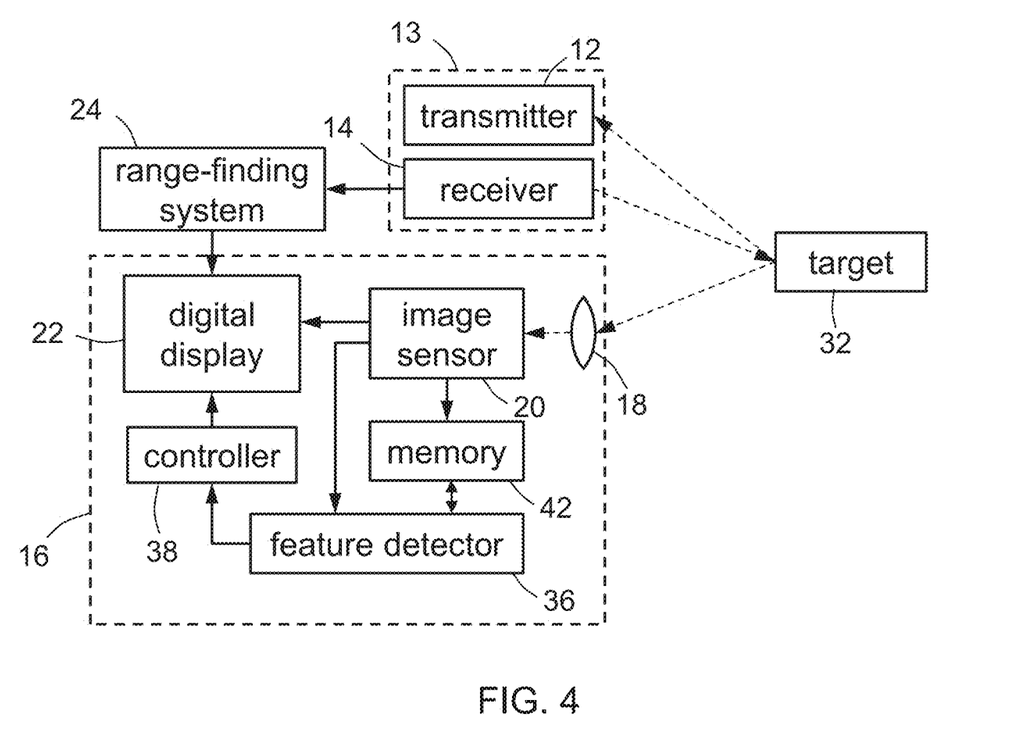
FIG. 4 is a block diagram of the main component of a distance detector according to another embodiment of the present invention.

In an embodiment, as shown in FIG. 4, the distance detector (10) further comprise a feature detector (36) configured to detect a preselected target object (32).

The feature detection mode can be activated by pressing a button (34) on the distance detector (10). In some embodiment the feature detection mode can be selected from a scroll down menu on the screen (22). Other selections option may also be available.

The feature detector (36), via a controller (38), control the digital display (22) to display a target object indicium (40) indicating a location of the target object (32) on the digital display (22). The preselected target object can be, but not limited to a flag in a golf course. In this embodiment the image detection system further includes a memory (42) for storing images of the user's view captured by the image sensor via a frame grabber (not shown).

Figure 5:
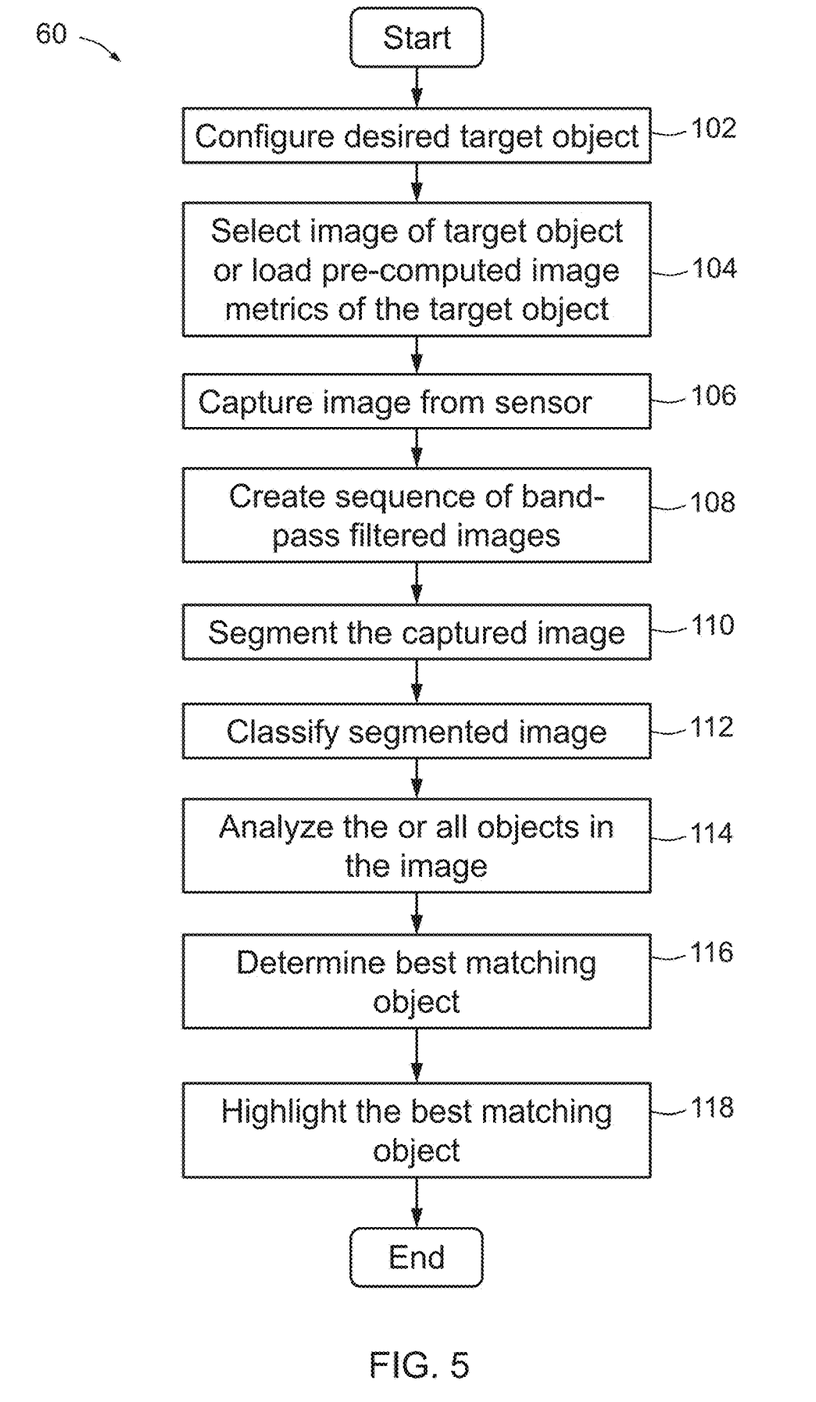
FIG. 5 is a flowchart of the feature detection steps.

The feature detector (36) includes a software that performs content-based digital image object detection. FIG. 5 is a flowchart of the software algorithm used by the feature detector to identify the target object.

A desired target object is specified by a set of image metrics computed prior to running the detection algorithm and stored within the device for future use. The feature detector (36) ranks the objects in a digital image based on their similarity to a desired target object and assigns them a score.

In the specific example, the detection algorithm is programmes to detect flags on a golf course and, together with the range-finding system, calculate the distance of the user to the flagstick and hence to the hole.

The steps of the software algorithm used by the feature detector (36) are outlined in a flow diagram (60) of FIG. 5.

At step 102, the user configures the desired target object. At step 104, the user either selects the image of a target object from images stored in the memory or loads the pre-computed image metrics of the desired object. Another available option offered to the user may be to select an object in the image of the user's view and store information of the object in the memory for comparison with the target object. The software may comprise an heuristic algorithm such that each time the desired target object is detected in the user's view, information regarding characteristics of the object is stored in the memory and used to improve the accuracy of the detection algorithm.

At step 106, detection algorithm sends instructions to the image sensor (20) to capture, via the frame grabber, an image of the view (105). The image is stored in the memory (42). At step 108, the detection algorithm creates a sequence of band-pass filtered images from the captured image and computes image metrics from band-pass filtered images. At step 110, the captured image is segmented using band-pass computed image metrics and, at step 112, classified to detect potential match objects. At step 114, the one or more objects in the image are analyzed by determining how well each object matches the selected object of interest. At step 116, the detection algorithm determines which object is the best match in the captured image.

At step 118, detection algorithm controls digital display (22) to highlight that object in the image display.

In some embodiments, when the closest match is found the device responds by vibrating and/or emitting at sound, to alter the user to the determination of that identification.

Figure 6A:
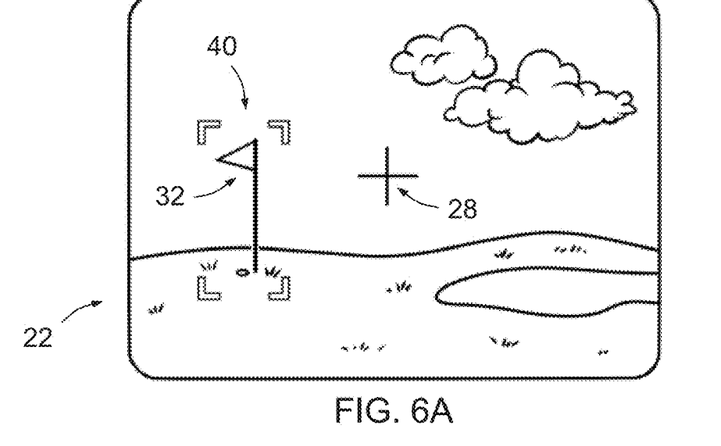
FIGS. 6A, 6B and 6C are notional screen shots of the image digital display of the distance detector of FIG. 1A or of FIG. 4.
Figure 6B:
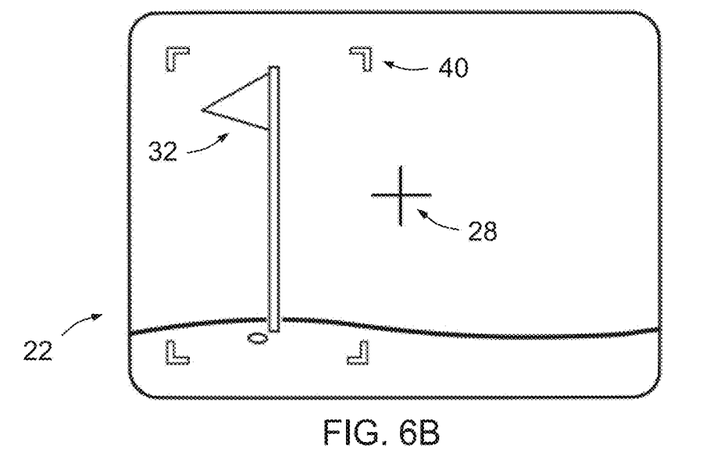
Figure 6C:
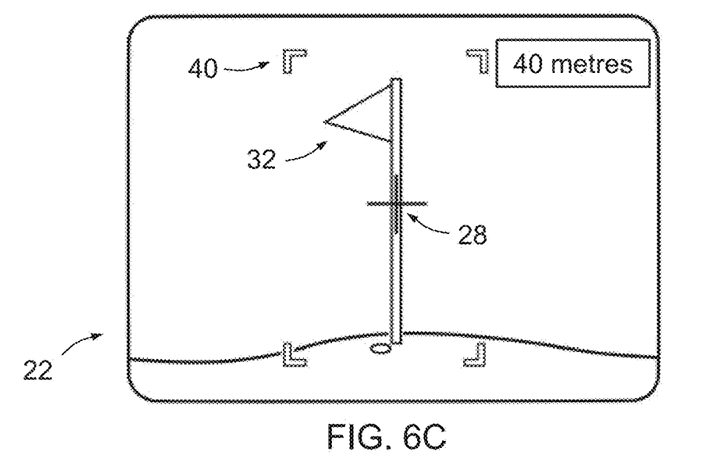

FIGS. 6A, 6B and 6C are notional screen shots of the image digital display (22). As shown in FIG. 6A, the target object indicium (40) at least partially boxes the flagstick as displayed on the digital display (22).

The target object indicium (40) is shown in FIGS. 6A, 6B and 6C as a partial rectangular box that surround the flagstick. The target object indicium can also include one or more elements displayed on the digital display suggestive of a square, rectangle or other quadrilateral.

FIG. 6B is a zoomed image of the flag surrounded by the rectangular box indicium. In the middle of the screen a cross indicates the laser beam indicium (28).

The range-finding system is configured to determine the distance to the target object (32) when the target object indicium (40) and the laser beam indicium (40) coincide or overlap as shown in FIG. 6C.

Advantageously, as shown in in FIGS. 6A, 6B and 6C the rectangular box indicium (40) defines a catchment area which is larger than the flag (32), which make it easy for the user to identify the flag and to overlap the laser indicium (28) to the target object indicium (40) and hence to the flag (32).

Figure 7A:
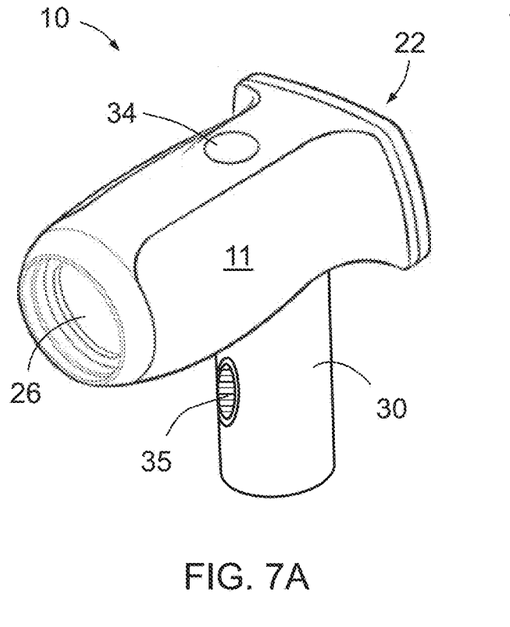
FIGS. 7A and 7B are respectively rear and front perspective views of a distance detector according to an alternative configuration of the first embodiment of the present invention.
Figure 7B:
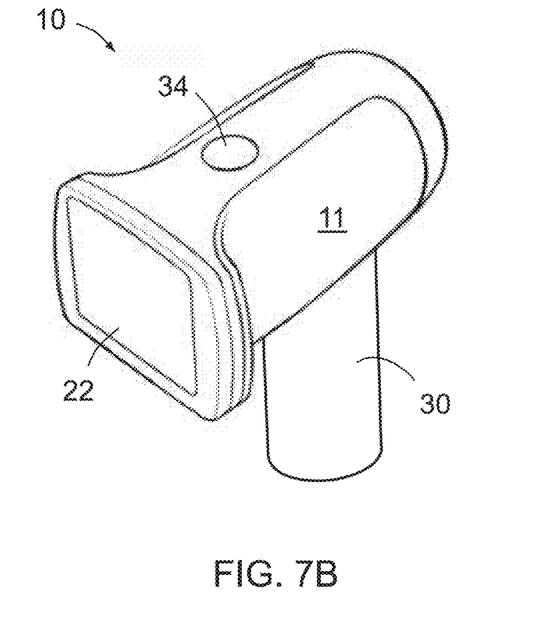

A variation of this embodiment is shown in FIGS. 7A and 7B. In this variation, the device (10) includes a 'pistol' style handle. The handle facilitates gripping of the device by the user, potentially making the device more stable. Other forms and shapes of handle may be used. Selection button(s) (34) may be arranged on device's main body (11) as previously illustrated, but they can also be arranged on the handle (30). The laser activation button (35) to activate the laser beam is preferably positioned on the handle so that the user can simply use one finger to press the button while the hand keep the device stable and in position. The handle (30) provides additional volume to accommodate the required electronics and, if desirable, to accommodate a greater optical path between—for example—objective lens (18) and image sensor (20) (possibly facilitated by the use of a mirror).

Figures 8A, 8B:
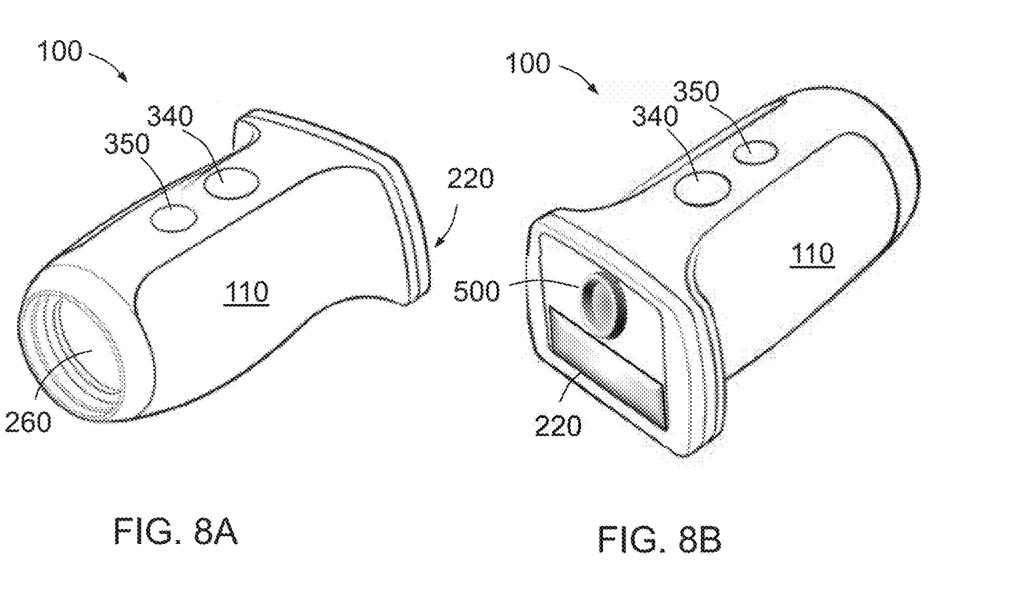
FIGS. 8A and 8B are respectively rear and front perspective views of a distance detector according to a second embodiment of the present invention.

Importantly, the feature detection software can also be implemented in range-finding devices that do not have a digital display that displays a real-time image of the user's view. This alternative embodiment is illustrated in FIGS. 8A and 9B. According to this second embodiment the distance detector include an eye-piece or view-finder through which the user can obtain a view of distant objects.

FIGS. 8A and 8B are respectively rear and front perspective views of a distance detector (100) according to this second embodiment. Distance detector (100) is in the form of an integral device having a main body (110), an eye-piece (500) and control button(s) (340) to allow the user to select operational modes and the like. The main body (110) includes a laser system (130) (including a laser transmitter (120) and receiver (140), an image detection system (160) and a range-finding system (240). The back window (260) in FIG. 1 is schematically represent as a single entity which includes the laser input and output and the light input/output for the eye-piece (500). Optionally, the device (100) may also include a digital screen (220) for displaying information such as the calculated distance to an object of interest. The digital screen (470) may incorporate touchscreen functionality to enable a golfer to select operational modes and choose other type of options that the device might have built-in.

Figure 9:
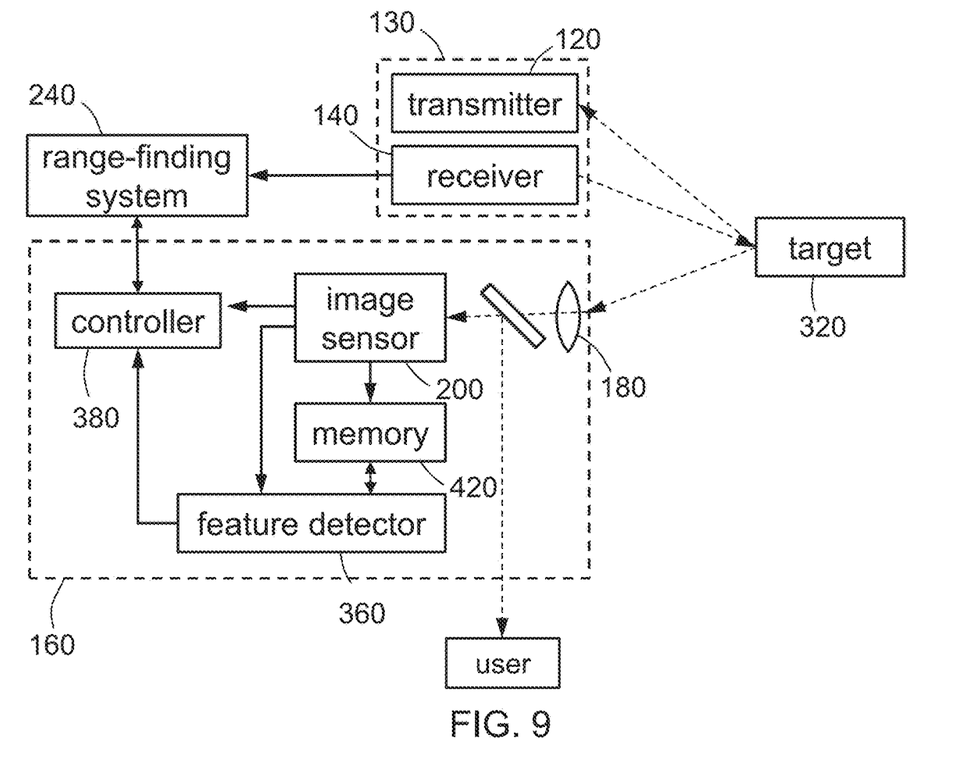
FIG. 9 is a block diagram of the main components of the distance detector of FIGS. 8A and 8B, with a target object.

FIG. 9 is a block diagram of the main functional components of the distance detector (100). The distance detector (100) includes a laser system (130) including a laser transmitter (120) for generating a laser beam. The laser beam is activated by pressing a button (350) on the distance detector and is directed towards one or more objects of interest. The laser beam irradiates an object (320) and it is reflected therefrom. The laser receiver (140) captures the light that is reflected from the object in response to the laser beam directed thereto.

The distance detector (100) further includes an image detection system (160) that includes an objective lens (180) for collecting light from a user's view, an image sensor (200) for receiving light collected by the objective lens and for generating the image therefrom, and an eye-piece or view-finder (500) through which the user can obtain a view of distant objects; eye-piece or view-finder (500) receives light collected by objective lens (180).

The image detection system further includes a beam-splitter to direct a portion of the light collected by objective lens (180) to the eye-piece (500) for real time vision and another portion of the light collected by objective lens (180) to conversion electronics, such as CCD or the like, that covert the light signal into digital form that can be stored in the memory (420). The beam-splitter may be, for example, in the form of a partially silvered mirror, such as a 50% silvered mirror, though other split ratios may also be utilised depending on the intended application and expected lighting conditions. Other types of dielectric mirrors may also be used providing a wide range of power splitting ratios that can be achieved via different designs of the dielectric coating.

The distance detector (100) further includes a laser beam indicium (280) indicating the direction of the laser beam. The laser beam indicium (280) can, for example, include cross hairs. The laser beam indicium (280) may be in the form of one or more physical marks on the eye-piece (500).

The distance detector (100) further includes a range-finding system (240) for determining the distance to an object (320) irradiated by the laser beam. The range finding system (240) includes a software that is configured to extrapolate the distance travel by the laser beam, when the object (320), irradiated by the laser beam, and the laser beam indicium (280) at least partially overlapping on the eye-piece (500).

In an embodiment, the range-finding system (240) is further configured to display the distance to an object (320) on the digital screen (470).

Figure 10A:
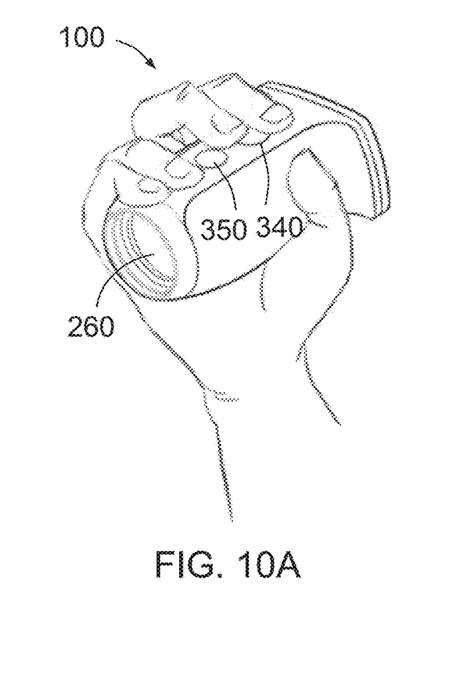
FIGS. 10A and 10B are views of the detector system held by the user.
Figure 10B:
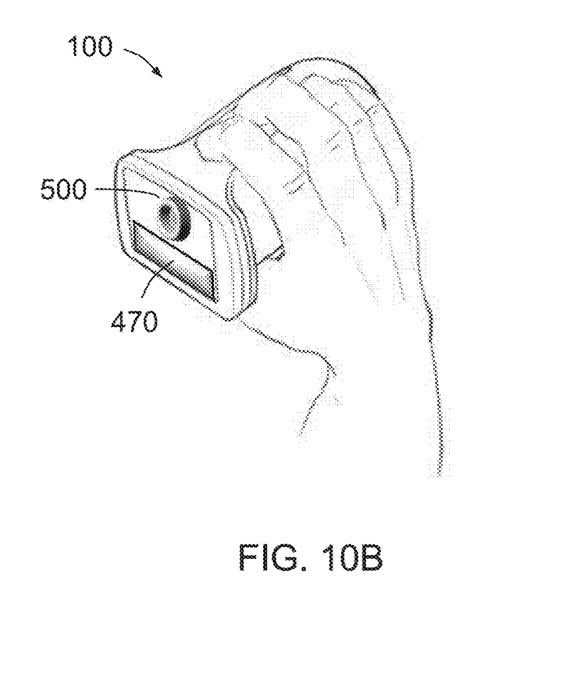

FIGS. 10A and 10B show the range-finding device (100) held by the user. The user can easily handle the device with one hand and select operational modes on the device (100).

The distance detector (100) further comprise a feature detector (360) configured to detect a preselected target object (320). The feature detection mode may be activated by the user depressing a button (340) on the distance detector (100). In some embodiments, the feature detection mode may be selected from a scroll-down menu on the digital screen (470). Other selections option may also be provided as desired.

The image detection system further includes a memory (420) for storing images of the user's view captured by the image sensor via a frame grabber (not shown).

The feature detector (360) includes software similar to that of detector (10) of FIG. 1. The beam-splitter configuration assures the user that the images captured by the image sensor are an accurate reflection of the user's view through eye-piece (500).

Figure 11:
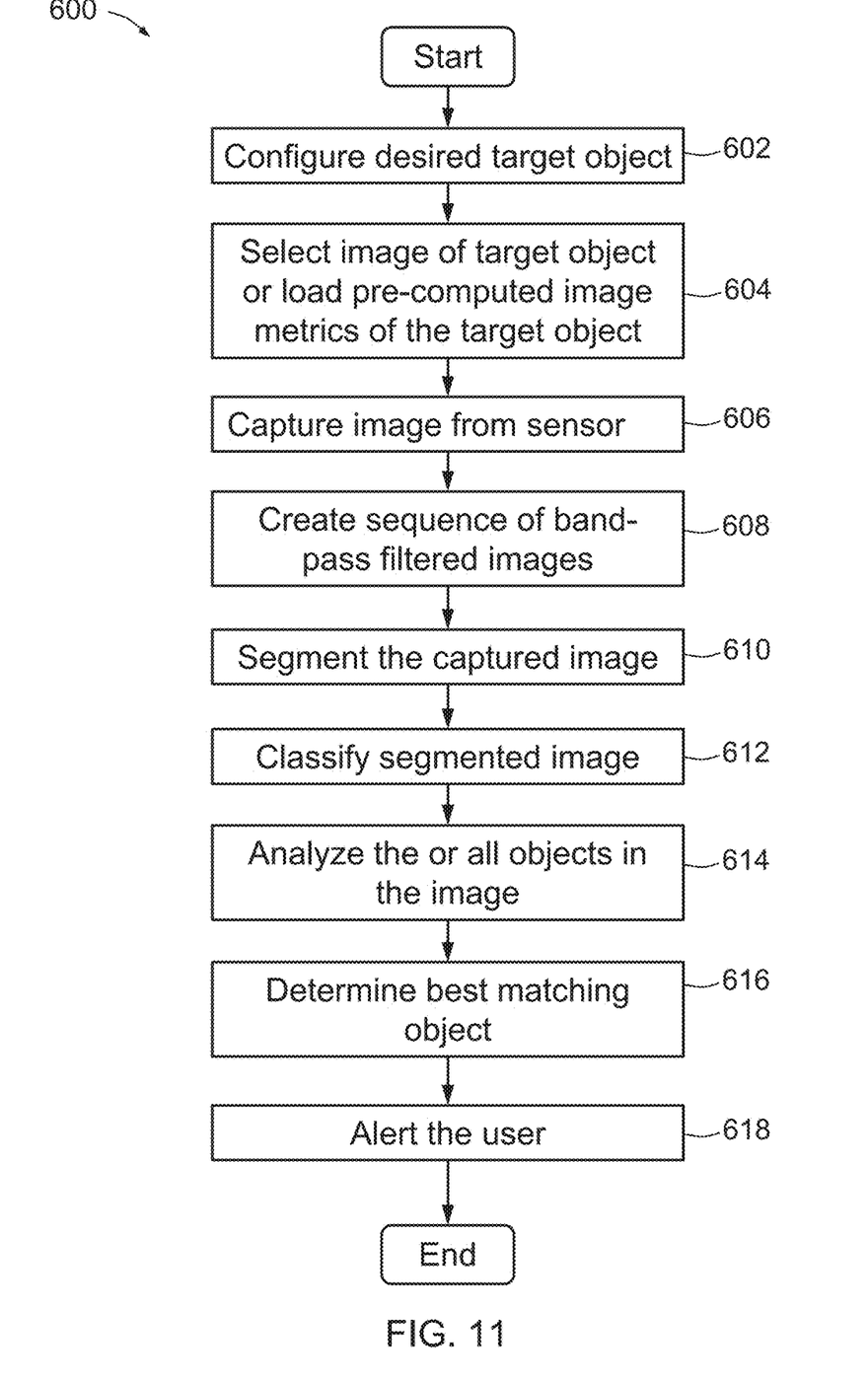
FIG. 11 is a flowchart of the feature detection steps.

The steps of the software algorithm used by the feature detector (36) are summarized in a flow diagram (600) of FIG. 11. At step 602, the user configures the desired target object. At step 604, the user either selects the image of a target object from images stored in the memory or loads the pre-computed image metrics of the desired object.

At step 606, detection algorithm sends instructions to the image sensor (200) to capture, via the frame grabber, an image of the view (605). The image is stored in the memory (420). At step 608, the detection algorithm creates a sequence of band-pass filtered images from the captured image and computes image metrics from band-pass filtered images. At step 660, the captured image is segmented using band-pass computed image metrics and, at step 612, classified to detect potential match objects. At step 614, the one or more objects in the image are analyzed by determining how well each object matches the selected object of interest. At step 616, the detection algorithm determines which object is the best match in the captured image.

At step 618, detection algorithm alerts the user that the best matching object has been identified in the current user's view. The notification is in the form of an alerting sound and/or vibration of the device, though in some cases the persistent display of a distance may be employed to communicate that the target object has been found and its distance determined.

Optionally, the digital screen (470) may be an image digital display for displaying a real-time image of the user's view and the feature detection mode will have similar an operational mode described above for the first embodiment.

In an embodiment, the distance detector includes a "scanning mode" that allows the user to move the laser beam across a range of objects to find the distance thereto in real time.

In some embodiment the distance detector includes a button (340) for selecting the "scanning mode". The mode remains active for the time the button (340) is pressed by the user. The mode is automatically deactivated when the user releases the button (340). In some embodiments the user can manually or electronically choose the window of time that the scanning mode remain active. In an alternative embodiment, the user can activate the "scanning mode" by selecting the option on the screen (470) from a scroll down menu.

In an embodiment, the device (100) includes a "lock-in mode" which allows the user to select a particular object and be assured that the distance obtained relate to the particular object selected. The user can select the "lock-in mode" on the device by pushing a button (340) on the device (100) or by choosing from options on the display (470). Other ways for selecting the operative mode may also be available.

The "lock in mode" of the second embodiment comprises features similar to the first embodiment outlined above.

Figure 12A:
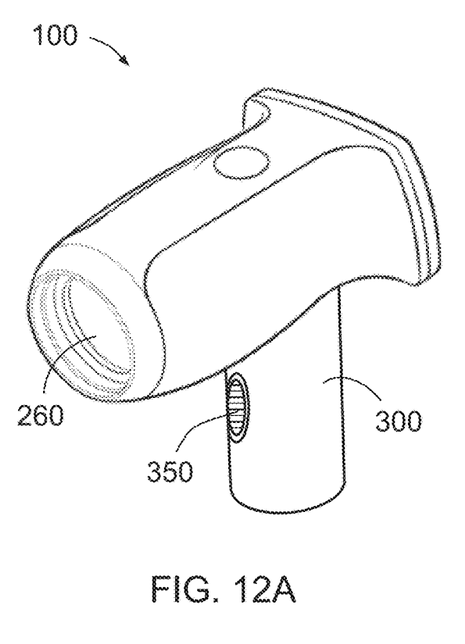
FIGS. 12A and 12B are respectively rear and front perspective views of a distance detector according to an alternative configuration of the second embodiment of the present invention.
Figure 12B:
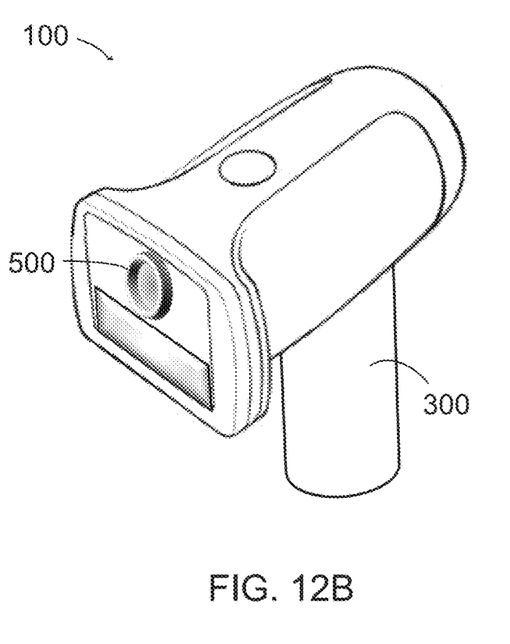

An alternative form of this embodiment is shown in FIGS. 12A and 12B. In this variation, the device (100) includes a 'pistol' style handle, which may also accommodate a greater optical path.

In conclusion the system and the method provided by the present invention significantly improve a golfer experience in the field by providing a device that facilitates the user real time view of the golf course and the flagstick. Additionally, the device according to the invention provides the user with the confidence that the calculated distance is indeed to the object of interest, such as the flag.

There may be other modifications to the embodiments, for example, in on embodiment the resilient support member and the optical fibre could be attached during a manufacturing process and installed as a unitary member.

It is to be understood that, if any prior art is referred to herein, such reference does not constitute an admission that such prior art forms a part of the common general knowledge in the art, in any country.

In the claims that follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. A distance detector for golf flag detection, wherein the distance detector is an integral device comprising:
  a laser transmitter and receiver for generating a laser beam to irradiate an object and to receive return light reflected from the object;
  an image detection system for generating an image of a view, the image detection system including an objective lens for collecting light from the view, an image sensor for receiving light collected by the objective lens and for generating the image therefrom, and a digital display for displaying the image such that the digital display displays a real-time image of the view;
  a feature detector configured to:
    receive the real-time image of the view;
    detect one or more objects within the real-time image; and
    perform content-based digital image object detection by:
      comparing the one or more objects the real-time image with a set of pre-computed image metrics, wherein a golf flag is specified as a desired target object;
      determining how well each of the one or more objects matches the desired target object and identify a best matching object as a golf flag from the one or more objects; and
    a range-finding system configured to determine a distance to the golf flag using the return light, and to display the distance.

2. The distance detector of claim 1, wherein the feature detector is configured to respond to detection of the golf flag by generating an alert to alert a user.

3. The distance detector of claim 1, comprising a laser beam indicium or a laser beam indicium generator configured to display the laser beam indicium, wherein the laser beam indicium indicates a direction of the laser beam.

4. The distance detector of claim 3, configured to display the laser beam indicium when the feature detector detects the golf flag, when the range-finding system determines the distance to the golf flag, or when the golf flag is centred in the digital display.

5. The distance detector of claim 1, wherein the range-finding system displays the distance to a target object on the digital display.

6. The distance detector of claim 1, wherein, when the laser beam is pointed at the golf flag for more than a first predefined time interval, the range-finding system displays the distance to the golf flag for at least a second predefined time interval.

7. The distance detector of claim 6, wherein the range-finding system ceases to display the distance to the golf flag after the second predefined time interval.

8. The distance detector of claim 3, wherein the laser beam indicium comprises cross-hairs.

9. The distance detector of claim 3, further comprising a view-finder for a user to view the golf flag.

10. The distance detector of claim 9 wherein the range-finding system displays the laser beam indicium so as to be viewable through the view-finder.

11. The distance detector of claim 9 wherein the laser beam indicium comprises one or more marks on the view-finder.

12. The distance detector of claim 1 wherein the feature detector is further configured to control the digital display to display a target object indicium indicating a location of the golf flag on the digital display.

13. The distance detector of claim 12, wherein the target object indicium at least partially boxes the golf flag as displayed on the digital display.

14. The distance detector of claim 12, wherein the target object indicium comprises one or more elements displayed on the digital display suggestive of a square, rectangle or other quadrilateral.

15. The distance detector of claim 12 comprising a laser beam indicium which indicates a direction of the laser beam, and wherein the range-finding system is configured to determine the distance to the golf flag when the target object indicium and the laser beam indicium coincide or overlap.

16. The distance detector of claim 3, wherein the range-finding system comprises the laser beam indicium generator.

17. The distance detector of claim 3, wherein the laser beam indicium comprises one or more marks on the digital display.

18. A distance detection method for golf flag detection, comprising:
transmitting a laser beam so as to irradiate an object;
receiving return light reflected from the object in response to irradiation of the object;
collecting light of a view that includes the object with an objective lens;
outputting an image of the view based on the return light;
receiving the image and displaying the image on a digital display such that the digital display displays a real-time image of the view;
detecting in the image a golf flag with a feature detector, the feature detector configured to:
receive the real-time image of the view;
detect one or more objects within the real-time image; and
perform content-based digital image object detection by:
comparing the one or more objects the real-time image with a set of pre-computed image metrics, wherein a golf flag is specified as a desired target object;
determining how well each of the one or more objects matches the desired target object and identify a best matching object as a golf flag from the one or more objects;
determining a distance to the golf flag using the return light; and
displaying the distance.

19. The distance detector of claim 1, wherein the image detection system includes a memory for storing images captured by the image sensor.

20. The distance detector of claim 19, wherein the feature detector is configured to perform an heuristic algorithm arranged such that each time a golf flag is detected in a user's view, information regarding characteristics of the golf flag is stored in the memory.

21. The distance detector of claim 1, further comprising a scanning mode that allows a user to move the laser beam across a range of objects including a golf flag as the desired target object to find the distance to the golf flag in real time.

22. The distance detector of claim 1, further comprising a "lock-in mode" which allows a user to select a golf flag as a particular target object, wherein when the user points the laser beam for more than a first predefined time interval, the golf flag as the particular target object is locked in the image display.

23. The distance detection method of claim 18, further comprising activating a "scanning mode" that allows a user to move the laser beam across a range of objects including a golf flag as the desired target object to find the distance to the golf flag in real time.

24. The distance detection method of claim 18, further comprising activating a "lock-in mode" which allows a user to select a golf flag as a particular target object, wherein when the user points the laser beam at the golf flag for more than a first predefined time interval, the golf flag is locked in the image display.

* * * * *